(12) United States Patent
Ku

(10) Patent No.: US 9,111,660 B2
(45) Date of Patent: Aug. 18, 2015

(54) METHOD FOR MANUFACTURING HIGH-NITROGEN STEEL WIRE AND OVERHEAD POWER LINE USING SAME

(75) Inventor: Jae Kwan Ku, Gunpo-si (KR)

(73) Assignee: Metal Link, Inc., Gyeonggi-do (KR)

( * ) Notice: Subject to any disclaimer, the term of this patent is extended or adjusted under 35 U.S.C. 154(b) by 234 days.

(21) Appl. No.: 13/811,232

(22) PCT Filed: Aug. 2, 2010

(86) PCT No.: PCT/KR2010/005069
§ 371 (c)(1),
(2), (4) Date: Feb. 20, 2013

(87) PCT Pub. No.: WO2012/011622
PCT Pub. Date: Jan. 26, 2012

(65) Prior Publication Data
US 2013/0146350 A1     Jun. 13, 2013

(30) Foreign Application Priority Data
Jul. 23, 2010  (KR) .................. 10-2010-0071593

(51) Int. Cl.
*H02G 7/05* (2006.01)
*H01B 5/08* (2006.01)
(Continued)

(52) U.S. Cl.
CPC ............. *H01B 1/02* (2013.01); *B32B 15/012* (2013.01); *C21D 9/52* (2013.01); *C21D 9/54* (2013.01);
(Continued)

(58) Field of Classification Search
CPC ........................................................ H01B 1/02
USPC .................. 174/40 R, 128.1, 128.2
See application file for complete search history.

(56) References Cited

U.S. PATENT DOCUMENTS 3,716,691 A * 2/1973 Baybrook et al. ......... 219/137 R
3,989,474 A * 11/1976 Goller et al. .................. 428/683
(Continued)

FOREIGN PATENT DOCUMENTS

| JP | 2003221615 A | 8/2003 |
| KR | 100358286 | 10/2002 |
| KR | 100538692 B1 | 12/2005 |

OTHER PUBLICATIONS

International Search Report of PCT/KR2010/005069, Jan. 14, 2010.

*Primary Examiner* — Timothy Thompson
*Assistant Examiner* — Sherman Ng
(74) *Attorney, Agent, or Firm* — Locke Lord LLP; Jeffrey D. Hsi

(57) ABSTRACT

Disclosed are a method for manufacturing a nonmagnetic high-nitrogen steel wire, and an overhead power line adopting the high-nitrogen steel wire as the core thereof. According to one embodiment, the method for manufacturing high-nitrogen steel wire comprises the steps of injecting argon (Ar) gas to reach atmospheric pressure after having first adjusted the pressure to $6 \times 10^{-5}$ torr for an initial vacuum using a pressurized vacuum induction melting (VIM) furnace; and injecting nitrogen gas to reach a pressure of 2 atmospheres after having first adjusted the pressure to $6 \times 10^{-5}$ torr for a second vacuum, and melting a nitrogen steel alloy consisting of 25 to 35 wt % of Mn, 25 to 35 wt % of Cr, 10 to 20 wt % of Ni, 0.5 to 1.0 wt % of C, and 20 to 35 wt % of Fe, which are alloy elements constituting nitrogen steel. The high-nitrogen steel wire manufactured in this manner has a nitrogen content ratio higher than 12,000 ppm, excellent mechanical strength, and nonmagnetic characteristics. By using this high-nitrogen steel wire, an overhead aluminum power line with a nonmagnetic steel core for reducing power loss and increasing power transmission capacity can be provided.

11 Claims, 2 Drawing Sheets

(51) Int. Cl.

| | |
|---|---|
| *H01B 1/02* | (2006.01) |
| *C21D 9/54* | (2006.01) |
| *C21D 9/56* | (2006.01) |
| *C21D 9/60* | (2006.01) |
| *C22C 22/00* | (2006.01) |
| *C22C 27/06* | (2006.01) |
| *C22C 30/00* | (2006.01) |
| *C22C 38/00* | (2006.01) |
| *C22C 38/02* | (2006.01) |
| *C22C 38/58* | (2006.01) |
| *H01B 13/00* | (2006.01) |
| *C23C 8/50* | (2006.01) |
| *C21D 9/52* | (2006.01) |
| *B32B 15/01* | (2006.01) |

(52) U.S. Cl.
CPC  *C21D 9/561* (2013.01); *C21D 9/60* (2013.01); *C22C 22/00* (2013.01); *C22C 27/06* (2013.01); *C22C 30/00* (2013.01); *C22C 38/001* (2013.01); *C22C 38/02* (2013.01); *C22C 38/58* (2013.01); *C23C 8/50* (2013.01); *H01B 13/0036* (2013.01)

(56) References Cited

U.S. PATENT DOCUMENTS

| | | | | |
|---|---|---|---|---|
| 5,328,529 | A * | 7/1994 | Cordea et al. | 148/327 |
| 5,861,605 | A * | 1/1999 | Ogawa et al. | 219/145.22 |
| 5,914,061 | A * | 6/1999 | Ogawa et al. | 219/145.22 |
| 6,325,766 | B1 * | 12/2001 | Anderson et al. | 600/585 |
| 7,228,627 | B1 * | 6/2007 | Yoshimura et al. | 29/872 |

* cited by examiner

METHOD FOR MANUFACTURING HIGH-NITROGEN STEEL WIRE AND OVERHEAD POWER LINE USING SAME

CROSS REFERENCE TO RELATED APPLICATIONS

This application is the national phase under 35 U.S.C. §371 of PCT International Application No. PCT/KR2010/005069, filed Aug. 2, 2010, which claims the benefit of Korean Patent Application No. 10-2010-0071593, filed Jul. 23, 2010, the entire contents of the aforementioned applications are hereby incorporated herein by reference.

TECHNICAL FIELD

The present invention relates to a method for manufacturing a nonmagnetic high-nitrogen steel wire, and an overhead power line adopting the high-nitrogen steel wire as the core thereof.

BACKGROUND ART

The ACSR (aluminum stranded conductors steel reinforced), which is conventionally used as overhead power lines, uses 7 strands of high-carbon steel wire as a material for the core that serves as the supporting cable of the power line.

The required tensile strength of the high-carbon steel wire is about 1,225-1,323 MPa (i.e., about 125-135 kgf/mm$^2$), and it is currently known that the magnetic permeability of the high-carbon steel wire is 4,000 or higher, hence a ferromagnetic substance.

The core materials constituting the overhead power line are the core, which allows the electric wire to maintain its strength, and an aluminum conductor, which is responsible for transporting the electric current.

The power loss occurred during the transmission includes an electric resistance loss, which occurs in the aluminum conductor by the electric current, and a core loss and an eddy current loss, which are uniquely induced in the core, which is a ferromagnetic substance.

Particularly, the magnetic field induced in the core during electric conduction disturbs the flow of electric current in the aluminum conductor and increases the effective electric resistance, resulting in further increase of electric resistance loss in the aluminum conductor.

Moreover, the electric resistance loss occurred in the aluminum conductor and the core and eddy current losses occurred in the ferromagnetic steel core are both discharged as Joule's heat.

The power loss occurred in the overhead power line lowers the transmission efficiency and causes the temperature in the power line to rise due to conversion to and discharge as the Joule's heat.

The excessive temperature rise in the power line is critically harmful to the stability of the power line.

Therefore, reducing the loss in the overhead power line is very important not only for the reduction of power loss but also for the stability of power transmission.

Studies of utilizing austenite stainless steel, which is non-magnetic nitrogen steel, as the core are underway in order to solve the above problems.

The power loss in the overhead power line can be reduced, while considering the above-described low-loss measures, by utilizing high-strength steel wire so as to minimize the cross-sectional area of the core.

The currently available high-nitrogen steel has the nitrogen concentration of about 2,000 ppm to 2,300 ppm and the tensile strength of 1,800 Mpa.

As the tensile strength becomes higher and the magnetic permeability becomes closer to 1, the core becomes more non-magnetic, making it possible to reduce the cross-sectional area thereof and thus reduce the electric resistance loss further. As a result, the cross-sectional area of the aluminum conductor, which surrounds the perimeter of the core, without changing the thickness of the steel wire, and thus the wire capacity of an ACNMSS (Aluminum Conductor Stranded Non-Magnetic Steel Support) overhead conductor using a non-magnetic substance can be greatly increased.

The conventionally industrialized worldwide manufacturing methods include the PESR (Pressurized Electroslag Remelting) method and the Plasma Arc Remelting method. The PESR method, which uses $Si_3N_4$ slag as its raw material and applies an ultrahigh pressure of 42 atmospheres in the furnace, can inject a large amount of nitrogen over several thousands of ppm. However, since the meltage per batch is limited, the PESR method is not appropriate for manufacturing the strands of the core of a power line, which is relatively long.

In the Plasma Arc Remelting method, alloy is dissolved by ultrahigh temperature Arc Plasma under a nitrogen atmosphere, and thus nitrogen monoatom dissociated by the plasma is penetrated into molten metal and increase the concentration of nitrogen. However, the amount of nitrogen molten in by the dissociation cannot be more than 1,000-2,000 ppm, and the nitrogen gas is rather evaporated before being dissolved in the alloy, and thus it is not possible to increase the nitrogen concentration in the alloy above a certain level.

Although an induction melting furnace is widely used for manufacturing the core, it is not easy to have an alloy contain a certain amount of nitrogen through a conventional alloy manufacturing process because nitrogen is gas.

DISCLOSURE

Technical Problem

The present invention provides a method for manufacturing high-nitrogen steel wire through a pressurized induction furnace process, and an overhead power line, in which capacity is increased by reducing a loss, using said method.

The present invention also provides austenite stainless steel in which a large amount of nitrogen is dissolved in master alloy by using a pressurized induction furnace and ferroalloy.

The present invention also provides a power line in which capacity is increased and loss is reduced by applying non-magnetic steel as its core.

Technical Solution

An embodiment of the present invention provides a method for manufacturing high-nitrogen steel wire, including: injecting argon (Ar) gas to reach atmospheric pressure after having first adjusted the pressure to 6×10−5 torr for an initial vacuum by inputting alloy components constituting nitrogen steel by use of a pressurized vacuum induction melting (VIM) furnace; and injecting nitrogen gas to reach a partial pressure of 2 atmospheres in a nitrogen gas environment after having first adjusted the pressure to 6×10−5 torr for a second vacuum and melting the alloy components constituting the nitrogen steel.

Here, the alloy components constituting the nitrogen steel consists of 25 to 35 wt % of Mn, 25 to 35 wt % of Cr, 10 to 20 wt % of Ni, 0.5 to 1.0 wt % of C, and 20 to 35 wt % of Fe.

Moreover, the alloy components constituting the nitrogen steel can consist of 35 wt % of Mn, 25.4 wt % of Cr, 15.5 wt % of Ni, 0.75 wt % of C, 0.92 wt % of Si, and 21 wt % of Fe.

A concentration of nitrogen in the high-nitrogen steel wire is 12,000 ppm or higher.

Another aspect of the present invention provides an overhead power line using high-nitrogen steel wire, including a core constituted by having a plurality of high-nitrogen steel wires stranded therein and a conductor wrapping the core, wherein alloy components of the high-nitrogen steel wire consists of 25 to 35 wt % of Mn, 25 to 35 wt % of Cr, 10 to 20 wt % of 0.5 to 1.0 wt % of C, and 20 to 35 wt % of Fe.

The high-nitrogen steel wire has a tensile strength of 210 kg/mm 2 and a magnetic permeability of 1.03 or lower.

The conductor in accordance with an embodiment of the present invention has a plurality of trapezoidal aluminum strands including a convex portion and a concave portion, respectively, on either side thereof and wrapping the core cylindrically.

Advantageous Effects

According to an embodiment of the present invention, by providing a dissolving process for manufacture of austenite stainless steel containing high-nitrogen by improving alloy components by use of a conventional induction furnace, it is possible to manufacture stainless steel having an austenite structure that contains about 12,000 ppm of nitrogen and has superb mechanical properties and non-magnetic property but is quite stable.

By adopting non-magnetic high-nitrogen steel as an inner core of the power line, the eddy current loss induced in the steel wire by alternating current, and thus large capacity, low loss power transmission, which reduces power loss of the power line, becomes possible.

The trapezoidal conductors in accordance with an embodiment of the present invention can increase the cross-sectional area of the conductor without changing the outer diameter of the wire, and thus it becomes possible to improve vibration fatigue properties by increasing the power transmission capacity and the contact area between the conductors The overhead power line in accordance with an embodiment of the present invention has a reduced core loss and an increased tensile strength due to the adoption of non-magnetic high-nitrogen steel and thus has a reduced cross-sectional area of the core. Accordingly, the cross-sectional area of the aluminum conductor is increase by as much as the reduced cross-sectional area of the core without changing the outer thickness of the wire, and thus it is possible to provide a large capacity, low loss power line.

MODE FOR INVENTION

Figure 1:
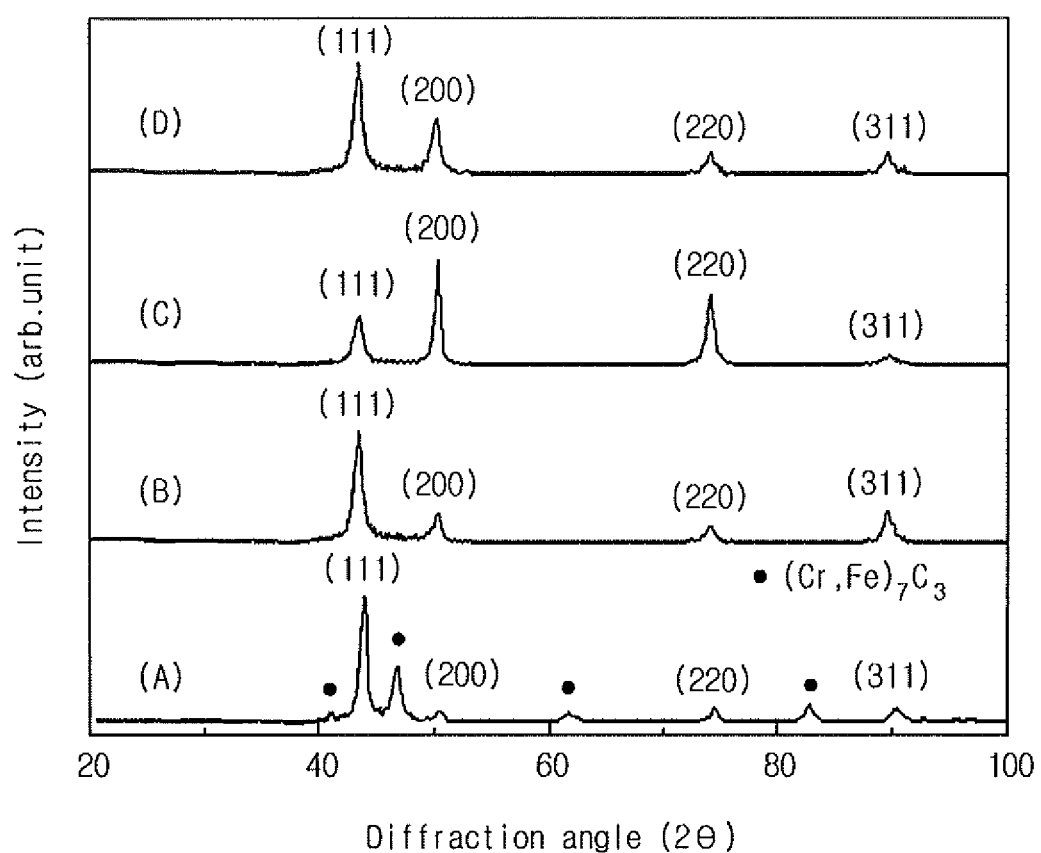
FIG. 1 shows an X-ray diffractometry of a test piece of casted high-nitrogen steel.

Austenitic stainless steel has excellent corrosion resistance compared to ferrite stainless steel or martensitic stainless steel and has good mechanical properties at high and low temperatures. Moreover, austenitic stainless steel has good impact resistance and is easy for cold drawing, molding and welding. Furthermore, austenitic stainless steel has good creep strength at high temperatures and is tough at low temperatures.

The most important practical property of austenitic stainless steel is its non-magnetic property, which is a unique property that cannot be obtained from other stainless steels. Using this non-magnetic property, austenitic stainless steel is widely used as core parts materials of various electric/electronic devices.

Moreover, since austenitic stainless steel is quite processable, austenitic stainless steel can be processed to various wire rods as well as fine wires having double-digit urn of diameter and used as various filters.

However, although austenitic stainless steel has a lower mechanical strength than those of ferrite stainless steel and martensitic stainless steel, there have been limitations in its application despite its excellent properties. Adding nitrogen has been hence suggested to overcome this shortcoming.

Nitrogen is a very effective alloying element that can improve the mechanical strength dramatically whilst stabilizing the austenite structure. Since the mechanical strength proportionally increases with the increasing amount of dissolved nitrogen, it is useful to increase the nitrogen content as much as possible.

However, since nitrogen is gas, it is not easy for an alloy to contain more than a certain amount of nitrogen.

Described hereinafter are some embodiments of the present invention.

In one embodiment of the present invention, an induction furnace using eddy current loss heat of a material itself is used as a dissolving facility.

Since alloying elements have different melting points and evaporating temperatures, respectively, introducing a high-temperature heat source to the alloying elements suddenly causes metals with low melting points to evaporate first, making it very difficult to control the alloy composition. Especially, in the case of a nitride, evaporation of nitrogen gas occurs suddenly during the dissolution, but it is easy to control the alloy composition with the induction furnace because the induction furnace uses the eddy current loss heat of the material itself.

In the case of charging and dissolving nitriding alloy as basic material, a certain level of pressurizing is necessary in order to suppress the evaporation of nitrogen gas generated after the nitriding alloy is dissolved.

In the present embodiment, the pressure is increased from 1 atmosphere to 2 atmospheres or higher, resulting in obtaining the nitrogen content of 12,100 ppm or more at 2 atmospheres. By applying more than 2 atmospheres, the nitrogen content can be increased, but the costs for pressurizing facility are relatively increased as well, and the elongation percentage drops to 3.2% or lower, making it inappropriate for a core of a power line.

Described below is a method for manufacturing a high-nitrogen alloy by use of the induction furnace in accordance with an embodiment of the present invention.

In a first step, nitrogen ferroalloy and metal material are inputted in a predetermined proportion in a crucible of a pressurized vacuum induction melting (VIM) furnace, then a pressure for an initial vacuum is adjusted to $6 \times 10^{-5}$ torr, and then argon (Ar) gas is injected to reach atmospheric pressure in order to create a clean dissolving environment.

In a second step, the pressure is adjusted to 6×10⁻⁵ torr for a second vacuum, and then high-nitrogen steel is manufactured by dissolving the above materials while a partial pressure in a nitrogen gas environment is adjusted to 2 atmospheres.

Here, in order to obtain an alloy containing a high concentration of nitrogen, nitrogen gas and a charging material of chromium nitride ferroalloy (6 wt % of N) are used, and high-nitrogen steels containing various concentrations of nitrogen are manufactured by varying the partial pressure of nitrogen to 0 atmosphere, 1 atmosphere, 1.5 atmospheres and 2 atmospheres. The composition of the manufactured alloy was analyzed using ICP, and nitrogen was analyzed using a gas analyzer, showing the results in Table 1.

In order to allow for a large amount of nitrogen content, it is preferable to input a large amount of alloying elements that can enhance the solubility of nitrogen. In an embodiment of the present invention, elements described below are added within the range of composition described below to increase the solubility of nitrogen.

Here, among major alloy components of nitrogen steel, 0.5 wt % or more of carbon (C) is added in order to secure the strength after a wire process. If less than 0.5 wt % of carbon is added, the strength of the nitrogen steel becomes insufficient for the core, and if 1.0 wt % or more of carbon is added, the ductility is deteriorated because carbides are precipitated during a cooling process after a thermal dissolving process.

Among the major alloy components of the nitrogen steel, manganese (Mn) is an austenite-generating element that increases the amount of nitrogen dissolved. In order to have the nitrogen steel approach the magnetic permeability of 1 and maintain its non-magnetic property, it is necessary to add 25 wt % or more of manganese. When less than 25 wt % of manganese is added, the magnetic permeability is increased even if the nitrogen content ratio is increased. However, when 40 wt % or more of manganese is added, the hot working property and corrosion resistance property are deteriorated, making the nitrogen steel unfit for the core.

Nickel (Ni) of the major alloy components of the nitrogen steel is an austenite-generating element that stabilizes an austenite phase.

In order to secure the non-magnetic property and ductility after a cold working process, 10 wt % or more of nickel is added. With less than 10 wt % of nickel, the austenite phase has an unstable form. With 30 wt % or more of nickel, the strength after the cold working process is deteriorated in addition to an intended ductility, and costs are increased.

Chromium (Cr) of the major alloy elements of the nitrogen steel is not only an element that increases the amount of nitrogen dissolved and contributes to improvement of corrosion resistance property but also a ferrite-generating element in austenitic steel. Accordingly, at least 25 wt % or more of chromium is added. With less than 25 wt % of chromium, the nitrogen content ratio of the alloy becomes below 12,000 ppm even if it is pressurized with 2 atmosphere or more. With 35 wt % or more of chromium, the hot working property is deteriorated for its purpose, and the ductility is deteriorated after a thermal dissolving process.

Therefore, summarizing the above, the alloy elements and their composition ranges are as follows.

Mn: 25(wt. %)≤X≤35(wt. %)

Cr: 25(wt. %)≤X≤35(wt. %)

Ni: 10(wt. %)≤X≤20(wt. %)

C: 0.5(wt. %)≤X≤1.0(wt. %)

Fe: 20(wt. %)≤X≤35(wt. %))

The large amount of nitrogen mixed in molten metal can be obtained from the nitrogen alloy that is used as the basic material, and it has been successful to dissolve about a maximum of 12,000 ppm by attempting to develop a dissolving process for manufacture of austenite stainless steel in which high-nitrogen is contained using the above-described alloy design method.

The solubility of nitrogen in a molten Fe-based alloy is determined by an interaction between nitrogen and alloying elements. Every interaction between atoms is either an exothermic or endothermic chemical reaction, and the extent of reaction can be described with a sign and a numerical expression. The extent of interaction, i.e., the reaction between the atoms, can be predicted from an interaction parameter.

It has been discovered through a very large number of studies that the heat of dissolution (heat of reaction) of nitrogen in the molten Fe-based alloy is proportional to interaction parameter $e_N^{(j)}$, and thus the solubility of nitrogen and the interaction parameter have the following relation.

$$\log[\% \text{ N}] = -\frac{188}{T} - 1.25 - \left[\frac{3280}{T} - 0.75\right]\sum_j e_{N(1873)}^{(j)}[\% \ j]$$

In an embodiment of the present invention, the solubility of nitrogen is determined by the interaction between the alloying elements and nitrogen, and since high-pressure nitrogen is applied during the solution, nitrogen gas can be inhibited from evaporating as much as possible, thereby making it possible to maximize the solubility of nitrogen in the molten metal.

Through the manufacturing method in accordance with an embodiment of the present invention, alloy compositions described below are selected to assess the nitrogen content. It has been determined that the alloy is Fe—Mn—Cr—Ni—N-based, and among these components, a very large amount of Mn has been added in order to increase the nitrogen content as much as possible.

By applying nitrogen pressure between 0 atmosphere and 2 atmospheres in order to suppress evaporating nitrogen gas during the solution, change in the solubility of nitrogen is assessed.

In another embodiment of the present invention, as shown in row D of Table 1, a nitrogen steel having a nitrogen concentration of 12,100 ppm while maintaining the elongation percentage of 3.2% or more is manufactured using an alloy with basic compositions of 21 wt % of Fe, 35 wt % of Mn, 25.4 wt % of Cr, 15.5 wt % of Ni, 0.75 wt % of C and 0.92 wt % of Si.

Here, in order to obtain an alloy containing a high concentration of nitrogen, chromium nitride ferroalloy (6 wt % of N) is used as raw material, and high-nitrogen steels containing various concentrations of nitrogen are manufactured by varying the partial pressure of nitrogen to 0 atmosphere, 1 atmosphere, 1.5 atmospheres and 2 atmospheres. The composition of the manufactured alloy was analyzed using ICP, and nitrogen was analyzed using a gas analyzer, showing the results in Table 1.

A solidification structure in a casted state is observed through an optical microscope, and an X-ray diffractometer (XRD) is used for a phase analysis, resulting in an austenite structure of FIG. 1 that is required for the present invention.

As nitrogen is dissolved in the alloy, the austenite structure can be stabilized and can achieve its non-magnetic property and high-strength property at the same time. Therefore, the most important factor in the present invention is that the microstructure of the manufactured alloy has a 100% austenite structure.

TABLE 1

Composition Analysis (wt %) of Manufactured Test Piece

|   | Fe | Mn | Cr | Ni | N | C | Si | PN2 (atm) |
|---|---|---|---|---|---|---|---|---|
| A | Bal. | 35.1 | 24.5 | 14.9 | — | 0.53 | 0.98 | 0.0 |
| B | Bal. | 34.9 | 25.3 | 14.3 | 1.15 | 0.63 | 0.79 | 1.0 |
| C | Bal. | 34.8 | 24.1 | 15.6 | 1.18 | 0.80 | 0.79 | 1.5 |
| D | Bal. | 35.0 | 25.4 | 15.5 | 1.20 | 0.75 | 0.92 | 2.0 |

TABLE 2

Mechanical Properties and Magnetic Permeability of Manufactured Test Piece

|   | Tensile Strength (kg/mm$^2$) | Yield Strength (kg/mm$^2$) | Elongation Percentage (%) | Magnetic Permeability |
|---|---|---|---|---|
| A | 110 | 95 | 5.0 | <1.5 |
| B | 190 | 165 | 3.8 | <1.05 |
| C | 200 | 170 | 3.5 | <1.04 |
| D | 210 | 180 | 3.2 | <1.03 |

While the maximum concentration of nitrogen in the currently-available high-nitrogen steel is about 2,300 ppm (0.23 wt %), the concentration of nitrogen in the alloy manufactured in accordance with an embodiment of the present invention is gradually increased as the partial pressure of nitrogen is increased, and has shown a very high nitrogen content of 12,100 ppm at the partial pressure of 2 atmospheres of nitrogen.

Moreover, with the superb mechanical property of the tensile strength of 210 kg/mm$^2$, the core used for the power line can have a reduced the cross-sectional area under the same mechanical conditions.

In the case of the conventional overhead power line with the core having the tensile strength of 125 kg/mm$^2$, an elongation percentage of about 4% is required, and the required elongation percentage may be further lowered if the tensile strength is increased.

In a tensile test for a steel wire in accordance with an embodiment of the present invention, the same safety factor for fracture or plastic deformation as a conventional core, which has the tensile strength of 125 kg/mm$^2$ and the elongation percentage of 4%, was observed in the D-type tensile strength of 210 kg/mm$^2$ and elongation percentage of 3.2%.

Therefore, the high-nitrogen steel wire in accordance with en embodiment of the present invention has proper mechanical properties for use as the core of an ACSR overhead power line, with an improved tensile strength and a low-loss non-magnetic property that can reduce a core loss.

It is determined that the reasons why a higher concentration of nitrogen is possible in an embodiment of the present invention than the conventional alloy material are that nitrogen is pressurized above the atmospheric pressure during the dissolving of the master alloy, that chromium nitride ferroalloy is used as the raw material, and that a large amount of Mn is contained for increasing the solubility of nitrogen.

Nitrogen is known to stabilize an austenite structure. FIG. 1 shows the results of analyzing the test piece in the casted state using X-ray diffractometry.

As shown in FIG. 1, in the alloys (B, C and D) in which a high concentration of nitrogen is contained in addition to the austenite stabilizing elements of Mn and Ni, a single-phase austenite structure was observed (the diffraction peaks of 111, 200, 220 and 311 are typical austenite crystal structures), and it can be seen that the alloy (A) in which nitrogen is not contained has other phases in addition to the austenite structure.

It has been identified that the phases indicated with black dots in alloy A are (chromium, iron) carbide ((Cr, Fe)$_7$C$_3$).

Therefore, it can be seen that the dissolving manufacture process developed in an embodiment of the present invention is a very useful process for manufacturing austenite stainless steel containing high-nitrogen of a few thousand ppm to 12,000 ppm.

Figure 2:
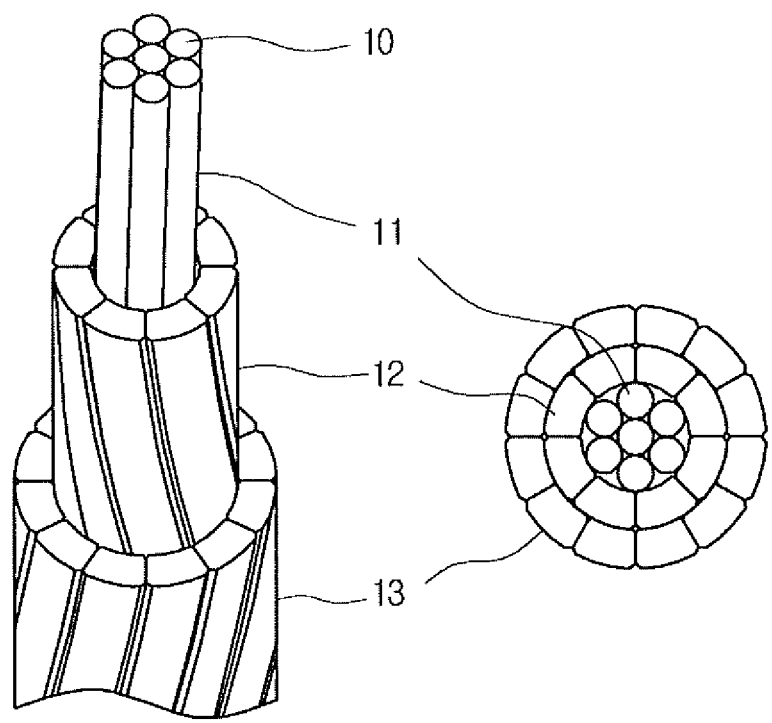
FIG. 2 shows cross-sectional views of an overhead power line in which trapezoidal conductors are formed around nitrogen steel wire in accordance with an embodiment of the present invention.

FIG. 2 illustrates an ACSR power line that can be a low-loss type and can increase power transmission capacity by use of the nitrogen steel in accordance with an embodiment of the present invention and shows a cross-section of an overhead power line in which trapezoidal conductors are formed around the high-nitrogen steel wire.

The overhead power line in accordance with an embodiment of the present invention includes a core 11, in which a plurality of steel wires 1 are stranded, and an aluminum conductor 12 enveloping the core 11 from an outside.

The core 11 in accordance with an embodiment of the present invention is surrounded by multiple layers of conductors 12, 13 that are trapezoidal wires to envelope the core cylindrically.

By applying the high-nitrogen steel core in accordance with an embodiment of the present invention, the cross-sectional area of the core 11 can be reduced, and accordingly the cross-sectional areas of the aluminum conductors 12, 13 can be increased by as much as the reduced area of the core 11 with a same external thickness.

Moreover, the trapezoidal conductor can increase the transmission capacity by having a greater cross-sectional area of the conductor than the conventional circular conductor and can improve vibration fatigue properties by increasing the contact area between the conductors.

In the aluminum conductors 11, 12, multiple layers of rectangular aluminum strands with a fixed thickness wrap the core 11 in a cylindrical form.

In one embodiment illustrated in FIG. 2, an internal conductors 11 and external conductors 12 that form the multiple layers are twined in opposite directions to prevent an imbalance in a ratio of expansion and contraction in the overhead power line due to external conditions.

Figure 3:
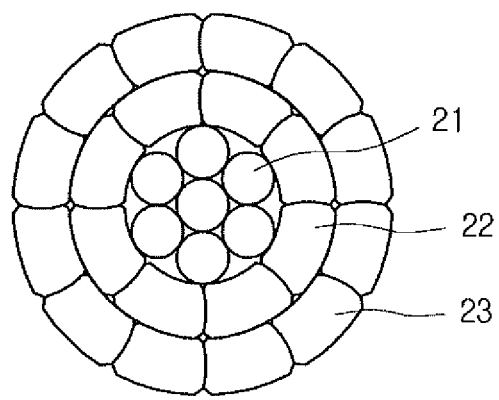
FIG. 3 shows a cross-sectional view of an overhead power line in which concavo-convex-type trapezoidal conductors are formed around nitrogen steel wire in accordance with an embodiment of the present invention.

FIG. 3 shows a cross-sectional view of an overhead power line for reducing power loss and increasing power transmission capacity in which concavo-convex-type trapezoidal conductors are formed around the nitrogen steel wire in accordance with an embodiment of the present invention.

In the case of the overhead power line using the trapezoidal conductors shown in FIG. 2, adjacent trapezoidal conductors are not perfectly in contact, making it possible to form stepped grooves along an external layer of the conductor. For an improvement of this, in an embodiment shown in FIG. 3, both sides of the trapezoidal conductor are made to be a convex portion and a concave portion, respectively, and the convex portions and the concave portions are formed to be in close contact with each other. In such a case, the convex portions and the concave portions are engaged with each other, making them difficult to separate from each other and preventing moisture from penetrating.

FIGS. 2 and 3 are an embodiment of the overhead power line for increasing power transmission capacity by using the non-magnetic high-nitrogen steel wire as the core in accordance with an embodiment of the present invention.

In an embodiment of the overhead power line using the high-nitrogen steel wire as the core, the non-magnetic core is utilized to reduce the core loss and increase the tensile strength, and thus the cross-sectional area of the core 11 can be reduced, and accordingly the cross-sectional area of the current-carrying aluminum conductor 12, 13 can be increased by as much as the reduced cross-sectional area of the core 11 with a same external thickness.

Therefore, since an embodiment of the present invention can reduce the cross-sectional area of the core, the cross-sectional area of the aluminum conductor 20 can be greatly increased without changing the thickness as of conventional power line, and thus the power transmission capacity can be increased and the cross-sectional area of the core and the core loss caused by being non-magnetic can be reduced. Therefore, it becomes possible to provide an overhead power line that can reduce the power loss and increase the power transmission capacity.

What is claimed is:

1. An overhead power line using high-nitrogen steel wire, comprising a core constituted by having a plurality of high-nitrogen steel wires stranded therein and a conductor wrapping the core, wherein alloy components of the high-nitrogen steel wire consists of 25 to 35 wt % of Mn, 25 to 35 wt % of Cr, 10 to 20 wt % of Ni, 0.5 to 1.0 wt % of C, and 20 to 35 wt % of Fe.

2. The overhead power line of claim 1, wherein a concentration of nitrogen in the high-nitrogen steel wire is 12,000 ppm or higher.

3. The overhead power line of claim 1, wherein the high-nitrogen steel wire has a tensile strength of 210 kg/mm 2 and a magnetic permeability of 1.03 or lower.

4. The overhead power line of claim 1, wherein the conductor has a plurality of trapezoidal aluminum strands wrapping the core cylindrically.

5. The overhead power line of claim 4, wherein the trapezoidal aluminum strands are formed in multiple layers.

6. The overhead power line of claim 4, wherein the trapezoidal aluminum strands include a convex portion and a concave portion, respectively, on either side thereof, and the convex portion and the concave portion of strands that are adjacent to each other at either sides of the trapezoidal aluminum strands are in close contact with each other.

7. The overhead power line of claim 4, wherein the aluminum strands are formed in multiple layers and include an inner layer and an outer layer that are twined in opposite directions.

8. An overhead power line using high-nitrogen steel wire, comprising a core constituted by having a plurality of high-nitrogen steel wires stranded therein and a conductor wrapping the core, wherein alloy components of the high-nitrogen steel wire consists of 35 wt % of Mn, 25.4 wt % of Cr, 15.5 wt % of Ni, 0.75 wt % of C, 0.92 wt % of Si, and 21 wt % of Fe.

9. The overhead power line of claim 8, wherein a concentration of nitrogen in the high-nitrogen steel wire is 12,000 ppm or higher.

10. The overhead power line of claim 8, wherein the high-nitrogen steel wire has a tensile strength of 210 kg/mm 2 and a magnetic permeability of 1.03 or lower.

11. The overhead power line of claim 8, wherein the conductor has a plurality of trapezoidal aluminum strands wrapping the core cylindrically.

* * * * *